(12) United States Patent
Thomas et al.

(10) Patent No.: US 10,677,175 B2
(45) Date of Patent: Jun. 9, 2020

(54) VENTILATION CONTROLS FOR DUAL-FUEL ENGINES

(71) Applicant: Cummins Inc., Columbus, IN (US)

(72) Inventors: Robert J. Thomas, Indianapolis, IN (US); David Lambert, Columbus, IN (US)

(73) Assignee: Cummins Inc., Columbus, IN (US)

(*) Notice: Subject to any disclaimer, the term of this patent is extended or adjusted under 35 U.S.C. 154(b) by 309 days.

(21) Appl. No.: 15/403,895

(22) Filed: Jan. 11, 2017

(65) Prior Publication Data
US 2017/0204792 A1    Jul. 20, 2017

Related U.S. Application Data

(60) Provisional application No. 62/279,039, filed on Jan. 15, 2016.

(51) Int. Cl.
| | |
|---|---|
| F02D 19/06 | (2006.01) |
| F02D 19/08 | (2006.01) |
| F02D 41/04 | (2006.01) |
| F02D 41/00 | (2006.01) |
| F02D 41/06 | (2006.01) |
| F02N 19/00 | (2010.01) |
| F02D 19/10 | (2006.01) |

(52) U.S. Cl.
CPC ..... *F02D 19/0615* (2013.01); *F02D 19/0621* (2013.01); *F02D 19/0647* (2013.01); *F02D 19/081* (2013.01); *F02D 41/0025* (2013.01); *F02D 41/042* (2013.01); *F02D 41/062* (2013.01); *F02D 19/105* (2013.01); *F02N 2019/002* (2013.01)

(58) Field of Classification Search
CPC ............ F02D 19/0615; F02D 19/0621; F02D 19/0647; F02D 19/081; F02D 19/105; F02D 41/0025; F02D 41/042; F02D 41/062; F02N 2019/002
See application file for complete search history.

(56) References Cited

U.S. PATENT DOCUMENTS

| | | | |
|---|---|---|---|
| 6,009,860 A * | 1/2000 | Brown | F02D 17/04 123/198 DB |
| 7,128,035 B2 | 10/2006 | Lancaster et al. | |
| 7,386,982 B2 | 6/2008 | Runkle et al. | |
| 8,640,456 B2 | 2/2014 | Watanabe | |
| 2013/0186059 A1 | 7/2013 | Epstein et al. | |
| 2018/0258868 A1 * | 9/2018 | Hagiwara | F02D 41/3064 |

* cited by examiner

*Primary Examiner* — Stephen K Cronin
*Assistant Examiner* — Ruben Picon-Feliciano
(74) *Attorney, Agent, or Firm* — Taft Stettinius & Hollister LLP

(57) ABSTRACT

One exemplary embodiment is a system comprising a dual-fuel engine structured to selectably combust a first fuel type and a second fuel type, and an electronic control system in operative communication with the dual-fuel engine. The electronic control system is structured to control a transition of the dual-fuel engine from a dual-fuel mode to a single-fuel mode. After initiating the transition from the dual-fuel mode to the single-fuel mode, the control system stops provision of the second fuel type, requires combustion using control parameters configured for the dual-fuel mode until a transition ventilation condition is satisfied, permits non-emergency commanded engine shutdown only if the transition ventilation condition is satisfied.

20 Claims, 4 Drawing Sheets

VENTILATION CONTROLS FOR DUAL-FUEL ENGINES

BACKGROUND

The present application relates generally to controls for dual-fuel engines. Existing attempts to provide controls for dual-fuel engines suffer from a number of shortcomings and disadvantages including those respecting the ability to provide appropriate fueling controls in response to transient and low load operating conditions. A further concern is that undesirable or inadequately controlled combustion may occur during certain dual-fuel engine operating conditions thereby negatively impacting safety, efficiency and emissions of pollutants. There remains a significant need for the unique apparatuses, methods, systems and techniques of including ventilation controls for dual-fuel engines which are disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

Unique dual-fuel engine controls and apparatuses, methods and systems relating to the same are disclosed. One exemplary embodiment is a system comprising a dual-fuel engine structured to selectably combust a first type of fuel and a second type of fuel, and a control system structured to control ventilation of the second type of fuel under a plurality of operating conditions. Further embodiments, forms, objects, features, advantages, aspects, and benefits shall become apparent from the following description and drawings.

DETAILED DESCRIPTION OF ILLUSTRATIVE EMBODIMENTS

Figure 1:
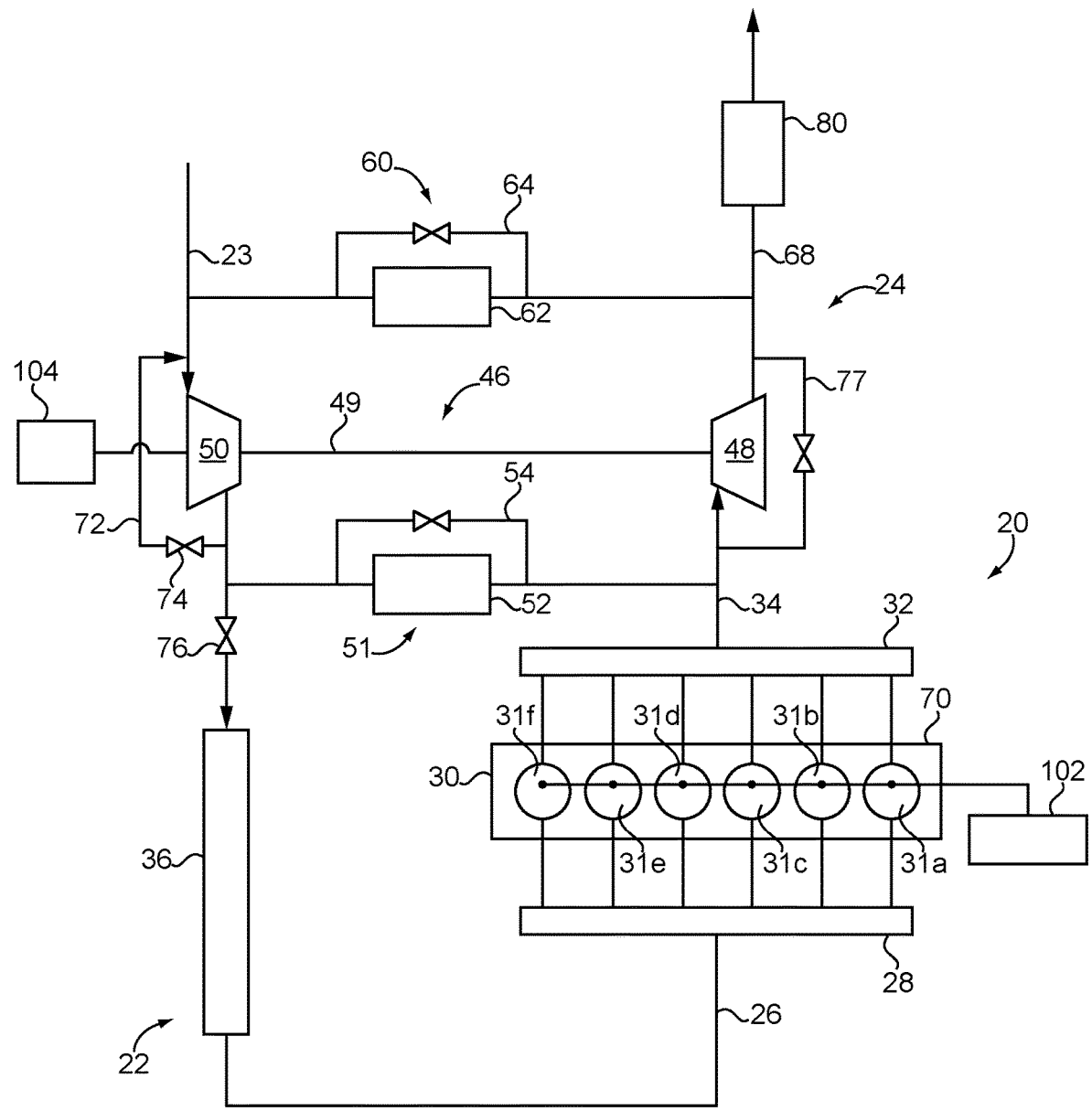
FIGS. 1 and 2 are schematic block diagrams illustrating certain aspects of an exemplary dual-fuel internal combustion engine system.
Figure 2:
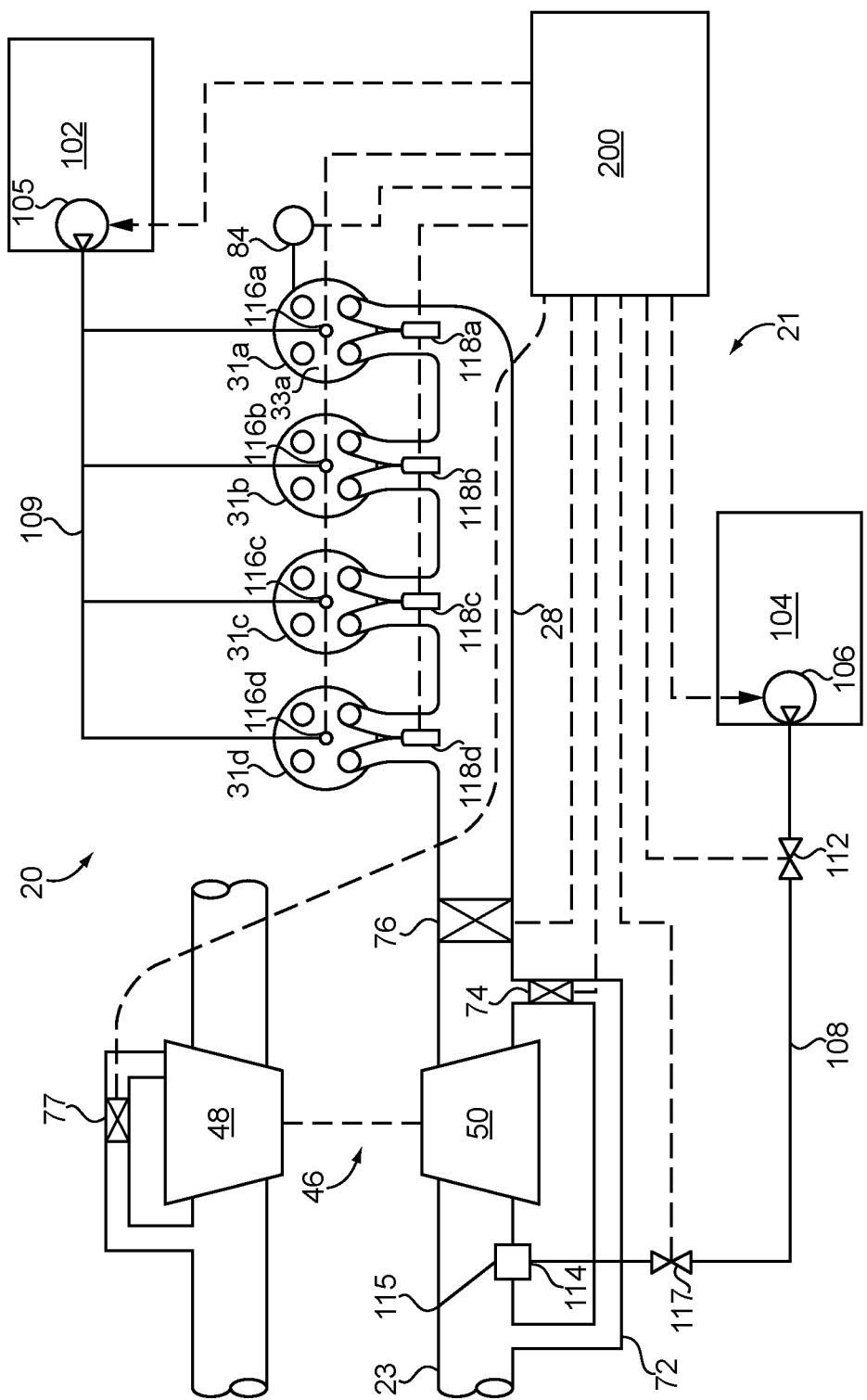

With reference to FIGS. 1 and 2, there are illustrated certain aspects of a dual-fuel engine system 20 and dual-fuel fueling system 21. System 20 is operable to combust a variable proportion of two or more types of fuel. System 21 is operable to provide fueling to engine 30 from a first fuel source 102 and a second fuel source 104 in variable proportions. Fuel source 102 and fuel source 104 store a first fuel and a second fuel, respectively, and the first fuel and the second fuel are of different types. Systems 20 and 21 are illustrated and described as providing two types of fuel for combustion, however, additional fuel sources may also be included to store and provide additional different types of fuel for combustion.

Engine system 20 includes engine 30 connected with an intake system 22 for providing a charge flow to engine 30 and an exhaust system 24 for output of exhaust gases. In certain embodiments, the engine 30 comprises a lean combustion engine such as a diesel cycle engine that uses a primary or first fuel that is a liquid fuel such as diesel fuel and a secondary or second fuel that is a gaseous fuel. The gaseous fuel can be, for example, natural gas, bio-gas, commercially available gas, methane, ethane, propane (LPG), butane, ethanol, producer gas, field gas, nominally treated field gas, well gas, nominally treated well gas, liquefied natural gas (LNG), compressed natural gas, landfill gas, condensate, coal-bed methane (CBM), liquid fuels that are readily vaporized (such as gasoline), and/or mixtures of these. Other types of first and second fuels may also be utilized. In certain embodiments, the first fuel is a fuel suitable for lean burning, and the second fuel is a fuel that utilizes stoichiometric or near-stoichiometric combustion except when combined with the first fuel during a dual-fueling operation. While certain embodiments disclosed herein are described in the context of a dual-fuel engine that combusts a variable proportion of diesel fuel and gaseous fuel, it shall be appreciated that other embodiments may combust different combinations of a first fuel type and a second fuel type, and may also combust additional types of fuel. Accordingly the term dual-fuel shall be understood to encompass multi-fuel engines structured to combust more than two types of fuel.

Engine 30 includes an engine block 70 that at least partially defines the cylinders 31*a*, 31*b*, 31*c*, 31*d*, 31*e*, 31*f* (collectively referred to as cylinders 31.) A plurality of pistons (not shown) are slidably disposed within respective cylinders 31 to reciprocate between a top-dead-center position and a bottom-dead-center position. Each of the cylinders 31, its respective piston, and the cylinder head form a combustion chamber. In the illustrated embodiment, engine 30 includes six such combustion chambers configured in an in-line arrangement. However, it is contemplated that engine 30 may include a greater or lesser number combustion chambers and that the combustion chambers may be disposed in an "in-line" configuration, a "V" configuration, a "W" configuration, a flat configuration, or in any other suitable configuration.

In one embodiment, engine 30 is a four stroke engine. That is, for each complete engine cycle (i.e., for every two full crankshaft rotations), each piston of each cylinder 31 moves through an intake stroke, a compression stroke, a combustion or power stroke, and an exhaust stroke. Thus, during each complete cycle for the depicted six cylinder engine, there are six strokes during which charge mixture is drawn into individual combustion chambers from intake supply conduit 23 and six strokes during which exhaust gas is supplied to exhaust manifold 32.

The engine 30 includes cylinders 31 connected to the intake system 22 to receive a charge flow and connected to exhaust system 24 to release exhaust gases produced by combustion of the first and/or second fuels. Exhaust system 24 may provide exhaust gases to a turbocharger 46, although a turbocharger is not required. In still other embodiments, multiple turbochargers are included to provide high pressure and low pressure turbocharging stages that compress the intake flow.

Exhaust system 24 can be connected to intake system 22 with one or both of a high pressure exhaust gas recirculation (EGR) system 51 and a low pressure EGR system 60. EGR systems 51, 60 may include a cooler 52, 62 and bypass 54, 64, respectively. In other embodiments, one or both of EGR systems 51, 60 are omitted. When provided, EGR system(s) 51, 60 provide exhaust gas recirculation to engine 30 in certain operating conditions. In any EGR arrangement during at least certain operating conditions, at least a portion the exhaust output of cylinder(s) 31 is recirculated to the engine intake system 22. In the high pressure EGR system 51, the exhaust gas from the cylinder(s) 31 takes off from exhaust system 24 upstream of turbine 48 of turbocharger 46 and combines with intake flow at a position downstream of compressor 50 of turbocharger 46 and upstream of an intake manifold 28 of engine 30. In the low pressure EGR system 60, the exhaust gas from the cylinder(s) 31a-31f takes off from exhaust system 24 downstream of turbine 48 of turbocharger 46 and combines with intake flow at a position upstream of compressor 50 of turbocharger 46. The recirculated exhaust gas may combine with the intake gases in a mixer (not shown) of intake system 22 or by any other arrangement. In certain embodiments, the recirculated exhaust gas returns to the intake manifold 28 directly.

Intake system 22 includes one or more intake supply conduit 23 connected to an engine intake manifold 28, which distributes the charge flow to cylinders 31 of engine 30. Exhaust system 24 is also coupled to engine 30 with an engine exhaust manifold 32. Exhaust system 24 includes an exhaust conduit 34 extending from exhaust manifold 32 to an exhaust valve. In the illustrated embodiment, exhaust conduit 34 extends to turbine 48 of turbocharger 46. Turbine 48 includes a valve such as controllable wastegate 77 or other suitable bypass that is operable to selectively bypass at least a portion of the exhaust flow from turbine 48 to reduce boost pressure and engine torque under certain operating conditions. In another embodiment, turbine 48 is a variable geometry turbine. In other embodiments, the exhaust valve is an exhaust throttle and/or wastegate.

In one embodiment, exhaust conduit 34 is flow coupled to exhaust manifold 32, and may also include one or more intermediate flow passages, conduits or other structures. Exhaust conduit 34 extends to turbine 48 of turbocharger 46. Turbocharger 46 may be any suitable turbocharger known in the art, including fixed-geometry turbocharger, variable-geometry turbine turbochargers and waste-gated turbochargers. Turbocharger 46 may also include multiple turbochargers. Turbine 48 is connected via a shaft 49 to compressor 50 that is flow coupled to intake supply conduit 23.

Exhaust from turbine 48 is provided to outlet conduit 68 which provides exhaust to an aftertreatment system 80. The aftertreatment system 80 may include, for example, oxidation devices (DOC), particulate removing devices (DPF, CDPF), constituent absorbers or reducers (SCR, AMOX, LNT), reductant systems, as well as additional or alternate exhaust aftertreatment components.

Compressor 50 receives fresh air flow from intake supply conduit 23. Second fuel source 104 may also be flow coupled at or upstream of the inlet to compressor 50 or downstream of compressor 50, as discussed further below. Intake system 22 may further include a compressor bypass 72 that connects a downstream or outlet side of compressor 50 to an upstream or inlet side of compressor 50. Compressor bypass 72 includes a control valve 74 that is selectively opened to allow charge flow to be returned to the inlet side of compressor 50 to reduce compressor surge under certain operating conditions, such as when an intake air shut off valve (ASOV) 76 is closed. Intake supply conduit 23 may include a charge air cooler 36 downstream from compressor 50 and intake ASOV 76 which may be structured as a throttle. In another embodiment, a charge air cooler 36 is located in the intake system 22 upstream of intake ASOV 76. Charge air cooler 36 may be disposed within intake supply conduit 23 between engine 30 and compressor 50, and embody, for example, an air-to-air heat exchanger, an air-to-liquid heat exchanger, or a combination of both to facilitate the transfer of thermal energy to or from the flow directed to engine 30.

In operation of engine system 20, fresh air is supplied through intake supply conduit 23. The fresh air flow or combined flows can be filtered, unfiltered, and/or conditioned in any known manner, either before or after mixing with the EGR flow from EGR systems 51, 60 when provided. The intake system 22 may include components configured to facilitate or control introduction of the charge flow to engine 30, and may include intake ASOV 76, one or more compressors 50, and charge air cooler 36. The intake ASOV 76 may also be positioned at different locations upstream or downstream of compressor 50 via a fluid passage and configured to regulate a flow of atmospheric air and/or combined air/EGR flow to engine 30 depending on its position. Compressor 50 may be a fixed or variable geometry compressor configured to receive air or air and fuel mixture from fuel source 104 and compress the air or combined flow to a predetermined pressure level before engine 30. The charge flow is pressurized with compressor 50 and sent through charge air cooler 36 and supplied to engine 30 through intake supply conduit 23 to engine intake manifold 28.

With further reference to FIG. 2, fueling system 21 is configured to provide multiple types of fuel to engine 30. Only four cylinders 31a, 31b, 31c, 31d are shown in FIG. 2, it being understood that if additional cylinders, such as cylinders 31e and 31f, or fewer cylinders, are provided they are arranged in a manner similar to the illustrated cylinders 31. Fueling system 21 includes first fuel source 102 and second fuel source 104. First fuel source 102 is configured to provide a first fuel type to cylinders 31 via one or more injectors at or near each cylinder. Second fuel source 104 is structured to provide a second fuel type and is connected to intake system 22 with a mixer or connection at or adjacent an inlet of compressor 50. In certain embodiments, the cylinders 31 each include at least one direct injector for delivering fuel to the combustion chamber thereof from a primary fuel source, such as first fuel source 102. In addition, one or more control valves, port injectors and/or mixers can be provided for delivery or induction of fuel from the second fuel source 104 with the charge flow delivered to cylinders 31. Such devices may be electronically controllable and may include one or more actuators for controlling flow of fuel from the second fuel source 104. In certain forms at least one of a port injector at each cylinder or a mixer at an inlet of compressor 50 are provided for delivery or induction of fuel from the second fuel source 104 with the charge flow delivered to cylinders 31.

The first fuel source 102 is controlled to provide the sole fueling at certain operating conditions of engine 30, and fueling from the second fuel source 104 is provided to replace a portion of fuel from the first fuel source 102 at other operating conditions to provide a dual flow of fuel to engine 30. In certain embodiments, the first fuel source 102 is diesel fuel and the second fuel source 104 is a gaseous fuel. An electronic control system including one or more controllers is structured to control the flow of liquid diesel fuel from first source 102 and the flow of gaseous fuel from second source 104 in accordance with the controls disclosed herein.

A direct injector, as utilized herein, includes any fuel injection device that injects fuel directly into a cylinder, and is capable of delivering fuel into the cylinder when the intake valve(s) and exhaust valve(s) are closed. The direct injector may be structured to inject fuel at the top of the cylinder or laterally of the cylinder. In certain embodiments, the direct injector may be structured to inject fuel into a combustion pre-chamber. Each cylinder 31 may include one or more direct injectors 116a-116d, respectively. The direct injectors 116a-116d may be the primary fueling device for first fuel source 102 for the cylinders 31.

A port injector, as utilized herein, includes any fuel injection device that injects the second fuel outside the engine cylinder in the intake manifold to form the air-fuel mixture. The port injector injects the fuel towards the intake valve. During the intake stroke, the downwards moving piston draws in the air/fuel mixture past the open intake valve and into the combustion chamber. Each cylinder 31a, 31b, 31c, 31d may include one or more port injectors 118a, 118b, 118c, 118d, respectively. In one embodiment, the port injectors 118a-118d may be the primary fueling device for second fuel source 104 to the cylinders 31. In another embodiment, the second fuel source 104 can be connected to intake system 22 with a mixer 115 at a gaseous fuel connection 114 upstream of intake manifold 28, such as at the inlet of or upstream of compressor 50. A flow control valve 117 can be provided to control the flow of gaseous fuel to engine 30 from second fuel source 104. In certain forms a first flow control valve and a second flow control valve may be used. For example, a gaseous fuel shut off valve may be provided upstream from a gaseous fuel control valve.

In certain embodiments, each cylinder 31 includes at least one direct injector that is capable of providing all of the designed fueling amount from first fuel source 102 for the cylinders 31 at any operating condition. Second fuel source 104 provides a flow of a second fuel to each cylinder 31 through a port injector or a natural gas connection upstream of intake manifold 28 to provide a second fuel flow to the cylinders 31 to achieve desired operational outcomes, such as improved efficiency, improved fuel economy, improved high load operation, and other outcomes.

An electronic control module (ECM) 200 is structured to control operation of a number of aspects of systems 20 and 21, including the provision of and combustion of multiple types of fuel. In certain embodiments, ECM 200 forms a portion of an electronic control system including one or more computing devices having memory, processing, and communication features. ECM 200 may comprise a single device, a distributed device or multiple devices in operative communication with one another. The functions of ECM 200 may be performed by various combinations of hardware and/or executable instructions stored on one or more non-transitory memory media. Instructions utilized by ECM 200 may be provided on a computer readable storage medium. ECM 200 may communicate with the sensors or actuators of systems 20 and 21 in a variety of manners, including through direct communication, communication over a datalink, and/or through communication with other controllers or portions of the processing subsystem that provide sensor and/or actuator information to ECM 200.

One embodiment of system 20 includes fueling system 21 with at least one fuel source 102 to provide a first fuel flow to all the cylinders 31 and a second fuel source 104 that provides a second fuel flow to all the cylinders 31 in addition to the first fuel flow under certain operating conditions. First fuel source 102 includes a first fuel pump 105 that is connected to ECM 200, and the second fuel source 104 includes, in one embodiment, a second fuel pump 106 that is connected to ECM 200. Each of the cylinders 31 includes an injector, such as direct injectors 116a-116d associated with each of the illustrated cylinders 31a-31d of FIG. 2. Direct injectors 116a-116d are electrically connected with ECM 200 to receive fueling commands that provide a fuel flow to the respective cylinder 31 in accordance with a fuel command determined according to engine operating conditions and operator demand by reference to fueling maps, control algorithms, or other fueling rate/amount determination source stored in ECM 200. First fuel pump 105 is connected to each of the direct injectors 116a-116d with a first fuel line 109. First fuel pump 105 is operable to provide a first fuel flow from first fuel source 102 to each of the cylinders 31a-31d in a rate, amount and timing determined by ECM 200 that achieves a desired power and exhaust output from cylinders 31.

If provided, second fuel pump 106 is connected to the inlet of compressor 50 with gaseous fuel connection 114 with a second fuel line 108 or to port injectors 118. A shutoff valve 112 can be provided in fuel line 108 and/or at one or more other locations in fueling system 21 that is connected to ECM 200. Second fuel pump 106 is operable to provide a second fuel flow from second fuel source 104 in an amount determined by ECM 200 that achieves a desired power and exhaust output from cylinders 31. In another embodiment, second fuel pump 106 is omitted and fuel is supplied to connection 114 or port injectors 118 under pressure from a pressurized second fuel source 104, and the flow of gaseous fuel from second fuel source 104 is controlled by flow control valve 117.

ECM 200 can be connected to actuators, switches, or other devices associated with fuel pumps 105, 106, intake ASOV 76, compressor bypass valve 74, shutoff valve 112, flow control valve 117, wastegate 77 and/or injectors 116, 118 and configured to provide control commands thereto that regulate the amount, timing and duration of the flows of the first and second fuels to cylinders 31, the charge flow, and the exhaust flow to provide the desired power and exhaust output. The positioning of each of shutoff valve 112, flow control valve 117, intake ASOV 76, compressor bypass valve 74, wastegate 77, injectors 116, 118 and/or the on/off status of fuel pumps 105, 106 can be controlled via control commands from ECM 200.

In other embodiments, a first subset of cylinders 31 is associated with a first cylinder bank (not shown) and a second subset of cylinders 31 is associated with a second cylinder bank. Accordingly, differing substitution rates of the gaseous fuel can be used for the cylinder banks. In certain embodiments of engines with multiple cylinder banks, the feed lines for the gaseous fuel can be separately controlled to each cylinder bank to provide the desired substitution rate of the gaseous fuel for the respective cylinder bank.

In certain embodiments of the systems disclosed herein, ECM 200 is structured to perform certain operations to control engine operations and fueling of cylinders 31 with fueling system 21 to provide the desired operational outcomes. ECM 200 may be in communication with each of the sensors and actuators disclosed herein in a number of manners including, for example, through direct communication, communication over a controller area network, communication over a datalink, and/or through communication with other controllers or portions of the processing subsystem that provide sensor and/or actuator information to the ECM 200.

Example and non-limiting implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured, any actuator including at least an electrical, hydraulic, or pneumatic actuator, a solenoid, an op-amp, analog control elements (springs, filters, integrators, adders, dividers, gain elements), and/or digital control elements.

One of skill in the art, having the benefit of the disclosures herein, will recognize that the controllers, control systems and control methods disclosed herein are structured to perform operations that improve various technologies and provide improvements in various technological fields. Without limitation, example and non-limiting technology improvements include improvements in combustion performance of dual-fuel internal combustion engines, improvements in engine torque generation and torque control, engine fuel economy performance, improvements in engine noise and vibration control for dual-fuel engines, improvements in performance or operation of aftertreatment systems and/or components of dual-fuel engines, and/or improvements in emissions reduction in dual-fuel engines. Without limitation, example and non-limiting technological fields that are improved include the technological fields of dual-fuel internal combustion engines and related apparatuses and systems as well as vehicles including the same.

Certain operations described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Figure 3:
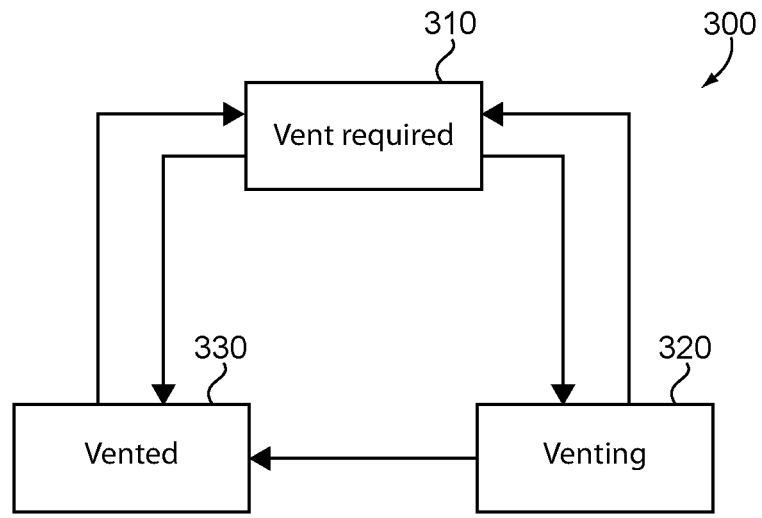
FIG. 3 is a state diagram illustrating control states for exemplary controls for a dual-fuel internal combustion engine system.

With reference to FIG. 3 there is illustrated a diagram showing control states of exemplary controls 300 for a dual-fuel internal combustion engine system. Controls 300 may be implemented in one or more components of an electronic control system which is structured to control operations of a dual-fuel engine system, for example, in ECM 200 which is structured to control operations of systems 20 and 21 described above as well as in other electronic control system components or combinations of multiple components.

Controls 300 are structured to provide ventilation of a dual-fuel engine system to ensure removal of unburned gaseous fuel present in the intake system and the exhaust system prior to starting the engine or transitioning the engine to diesel-only operation. Controls 300 may be structured to utilize distinct sets of control parameters for controlling combustion in a dual-fuel mode and a single-fuel mode. In certain embodiments, controls 300 may be structured to control combustion using a first set of combustion parameter reference tables adapted for combustion of a single fuel type and a second set of combustion parameter reference tables adapted for concurrent combustion of two or more fuel types. The second set of combustion parameter reference tables may utilize a substitution rate or other applicable variable(s) to identify control parameters based on engine operating conditions.

In certain embodiments, when the engine system 20 is controlled in a first fuel mode such that a first fuel (e.g., diesel fuel) is the primary or sole fuel supplied to the engine, controls 300 may reference one or more fueling tables, maps, models, control algorithms, or other fueling rate/amount determination sources (collectively "first fuel table") to determine one or more fuel injection parameters. For example, controls may reference a first fuel table stored in a non-transitory memory structure to determine one or more injection parameters relating to the timing, amount, and/or pressure at which first fuel is to be injected into the combustion chambers by the fuel injectors. The determined injection parameter(s) may be used by controls 300 to control the operation of engine system 20. When the engine system 20 is controlled to operate in a dual-fuel mode such that a combination of the first fuel (e.g., diesel fuel) and a second fuel (e.g., a gaseous fuel) is supplied to the engine, controls 300 may reference one or more other fueling tables, maps, models, control algorithms, or other fueling rate/amount determination sources (collectively "dual-fuel table") to determine injection parameters for the first fuel while the engine system 20 is operating in the dual-fuel mode. Similar to the first fuel table, the dual-fuel table may be utilized to determine injection parameter(s) that are used by the controller 200 to control the operation of the engine system 20. In certain embodiments, interpolation between the first-fuel tables and the dual-fuel tables may be utilized during transition events.

Controls 300 may be structured to initiate transition from a dual-fuel mode to a single-fuel mode. In certain embodiments, after initiating transition from the dual-fuel mode to the single fuel mode, controls 300 turn off the supply of gaseous fuel to the engine but continue to use the dual-fuel mode control parameters to combust residual gaseous fuel. Thus, although dual-fuel mode operation has been exited by closing a gaseous fuel shut-off valve thereby disabling supply of gaseous fuel to the engine, the controls may continue to utilize dual-fuel mode combustion control parameters to provide engine control commands. This operation may continue until a ventilation status monitor indicates that all gaseous fuel in the intake system has been combusted and the exhaust product of this combustion has exited the system. At this point, the controls switch back to the single-fuel mode (e.g., diesel-only) tables.

For certain dual-fuel engine systems, during startup ventilation, an engine starter is on, a gaseous fuel shut-off valve is closed, diesel fueling is disabled, and a gaseous fuel control valve downstream from the gaseous fuel shutoff valve is opened so that any leftover fuel in the intake and exhaust systems is pumped through the engine and out of the exhaust system by the movement of the pistons. Ventilation is useful to lower the risk of accidentally igniting potential charge in the intake or exhaust system when starting or running with diesel-only fueling control settings when there is still gaseous fuel entering the cylinders. In certain embodiments controls 300 are structured to determine the ventilation status of the system. The ventilation status is preferably a powerdown save variable that is set to an initial value requiring ventilation on the first starting attempt.

In certain embodiments, during ventilation, residual gas is pumped by the rotating engine. Using the number of engine cycles completed, the engine displacement, and engine volumetric efficiency information, the volume of the gas that has been pumped or displaced by the engine can be determined. A calibration value or other control parameter can be utilized to configure the amount of gas to be vented, which allows determination of when the venting cycle is complete. In certain embodiments, the amount of gas to be vented is at least as large as the combined volume of the intake system, the cylinders, the exhaust system, and the aftertreatment system. The pumped unburnt gaseous fuel exits the system at a point downstream of the aftertreatment system outlet.

For certain dual-fuel engine systems, during mode transition ventilation, the gaseous fuel shut off valve is closed, diesel fueling is mandated or required, and the gaseous fuel control valve which is downstream from the gaseous fuel shut off valve is opened, so that any gaseous fuel in the intake system is combusted by the engine and any of the resulting exhaust in the exhaust system is vented out of the exhaust system. Mode transition ventilation is preferably effective to combust residual gaseous fuel so that the products of combustion can be treated by the exhaust aftertreatment system as per any of a number of emissions control strategies. During mode transition ventilation, non-emergency engine shutdown may be inhibited until a transition ventilation criterion is satisfied and permitted thereafter, while emergency engine shutdown may be permitted to override the mandated or required diesel fueling and to stop the engine without the transition ventilation criterion being satisfied. Emergency engine shutdown events may include actuation of an ASOV to rapidly interrupt combustion as well as events that force an interruption of combustion without actuating an ASOV such as by a command to end diesel fueling which overrides the transition mode ventilation controls. Emergency shutdown events may be initiated by an operator actuating a control device such as an emergency shutoff switch or by a controller based upon detection and evaluation of the engine operating state. Non-emergency engine shutdown may be initiated by a key-off event or other non-emergency commands to stop engine operation.

Controls 300 may include vent required state 310, venting state 320 and vented state 330. In state 310, controls 300 are structured to determine whether a condition requiring engine ventilation is true for either or both of engine operation and engine starting. If a condition requiring ventilation is true, controls 300 proceed to venting state 320. If no condition requiring ventilation is true, controls 300 proceed to vented state 330.

In state 310, controls 300 may determine that a condition requiring ventilation exists during engine operation when transition out of a dual-fuel mode is commanded or requested. For example, when the engine is operating in a dual-fuel mode to combust a combination of diesel fuel and gaseous fuel, controls 300 may be structured to determine that a condition requiring ventilation exists if a ventilation completion condition is false and a transition condition from dual-fuel mode to single-fuel mode is true. The logical state of the ventilation completion condition may be determined using a timer or a counter which evaluates the duration of ventilation operation or a number of engine cycles relative to a threshold for the timer or counter. The logical state of the ventilation completion condition may also be determined using additional techniques described herein. The transition condition may be determined based upon a variable or flag which is set when the dual-fuel engine controls indicate that a transition from dual-fuel mode to diesel-only mode has been commanded or requested as may occur, for example, under light load conditions (e.g., idle), transient conditions, or other engine output and emissions conditions for which diesel-only operation is desired. If ventilation is required during engine operation, controls 300 are structured to require that dual-fuel combustion control continue after the supply of a second fuel is ended until the ventilation completion condition is true. This allows controls 300 to avoid undesired and potentially damaging or dangerous combustion events such as cylinder over pressure events, undesired auto-ignition of fuel, and exhaust system combustion.

In state 310, controls 300 may determine that a condition requiring ventilation exists during engine starting when a ventilation required variable is true. The ventilation required variable may be stored as a powerdown save variable. The ventilation required variable may be set to true when the engine is stopped without completing ventilation such as during an emergency engine stop, for example, when an air shut off valve is closed to quickly inhibit combustion. The ventilation required variable may also be set to true as an initial state such that when a control component implementing controls 300 is first installed, the ventilation required variable is always true. This will ensure ventilation when a control component it replaced. If ventilation is required during engine starting, controls 300 are structured to prevent diesel fueling until the ventilation completion condition is true. This allows controls 300 to avoid undesired and potentially damaging or dangerous combustion events such as cylinder over pressure events, undesired auto-ignition of fuel, and exhaust system combustion.

In state 320, controls 300 may increment the value of a timer structured to time the duration of ventilation operation and compare the current value of the timer to a threshold. Controls 300 may alternatively or additionally increment the value of a counter structured to count the number of engine cycles during ventilation and compare the current value of the counter to a threshold. Controls 300 may be structured to determine or set the timer threshold and/or counter threshold in a number of manners. In certain forms, the timer and/or counter threshold is set base upon empirical observations of the time and/or number of engine cycles required for engine ventilation and a margin of error for the same. In certain forms, the timer and/or counter threshold is set based upon calibratable information relating to the structured and dimensions of the dual-fuel engine system. These dimensions preferably account for the total volume from the gas supply shutoff to the exhaust outlet to ambient and the number of engine cycles needed to equal or exceed that volume. For example, in a system which includes a left cylinder bank (LB) and a right cylinder, bank (RB), two stage turbocharging, and two stage aftercooling, controls 300 may be structured to set a threshold for a number of engine cycles using equations (1), (2) and (3) below:

LB Engine Cycle Ventilation Threshold=(((volume between gas mixer and first compressor LB)+ (volume between first compressor and first aftercooler LB)+(volume between first aftercooler and second compressor LB)+(volume between second compressor and second aftercooler LB)+(volume between second aftercooler and cylinders LB)+(volume of exhaust manifold LB)+(volume of exhaust stack LB)+(volume of other exhaust system components LB)+(volume between gaseous fuel supply shutoff and gas mixer LB)+(volume of first and second turbochargers LB)+(volume engine displacement/2))*
(ventilation margin factor LB))/(volume engine
displacement/2)    (1)

RB Engine Cycle Ventilation Threshold=(((volume
between gas mixer and first compressor RB)+
(volume between first compressor and first
aftercooler RB)+(volume between first aftercooler and second compressor RB)+(volume
between second compressor and second aftercooler RB)+(volume between second aftercooler
and cylinders RB)+(volume of exhaust manifold
RB)+(volume of exhaust stack RB)+(volume of
other exhaust system components RB)+(volume
between gaseous fuel supply shutoff and gas
mixer RB)+(volume of first and second turbochargers)+(volume engine displacement/2))*
(ventilation margin factor))/(volume engine displacement/2)    (2)

Engine Cycle Ventilation Threshold=MAX(LB
Engine Cycle Ventilation Threshold AND RB
Engine Cycle Ventilation Threshold)    (3)

By determining an engine cycle ventilation threshold in accordance with Equations (1), (2) and (3), controls 300 may ensure that a complete venting of all gasses has occurred for both the left cylinder bank and the right cylinder bank. Furthermore, by performing separate calculations for the left and right banks, controls 300 may account for volumetric variation between the banks. It shall be appreciated that in single bank engines, this variation will not exist and a single calculation similar to Equation (1) or (2) may be performed with the modification that the engine displacement values would not be divided by 2. It shall be further appreciated that the particular volume components which are added together in Equations (1) and (2) may vary depending on the equipment utilized in various engine systems. Additional and/or alternate volume terms may be present for certain embodiments and certain embodiments may set one or more volume terms to zero.

The controls disclosed herein may evaluate an engine ventilation condition using a number of techniques effective to provide sufficient ventilation of gaseous fuel. Some techniques may count engine cycles under an assumption that each cycle pumps the engine displacement volume. Such techniques may use a margin of error to account for variation in volumetric efficiency of the engine as well as tolerances of the volume information of the engine and the elements in the intake and exhaust systems. Some techniques may explicitly account for volumetric efficiency of the engine and may count or sum the estimated volume displaced by each cycle which may vary from the engine displacement volume. Some techniques may evaluate a timer or counter relative to a threshold which is empirically determined to provide sufficient engine ventilation. Such techniques may account for variations in engine speed to calibrate the timer or counter. Some techniques may utilize a sensor, such as an $O_2$ sensor to measure gas composition at a given location to directly measure the status of ventilation. Some techniques may utilize combinations of the foregoing techniques. It shall be appreciated that these techniques are examples of techniques effective to ensure that the engine has displaced or pumped a predetermined volume sufficient to ensure ventilation of the engine, the intake system and the exhaust system.

In state 320, controls 300 are structured to return to state 310 if during an engine start attempt, the ventilation completion condition is not satisfied before the engine stops spinning, or if during engine operation following a transition from dual-fuel mode, the ventilation completion condition is not satisfied before the dual-fuel operating mode is again commanded and initiated, and to proceed to state 330 if the ventilation completion condition is satisfied. In state 330, controls 300 are structured to transition to state 310 when the admission of the second fuel source to the engine is initiated or the possibility of the second fuel being present in the engine intake system otherwise exists. State 310 may determine whether conditions requiring ventilation are true as described above and controls 300 may proceed to state 320 or 330 depending on this evaluation.

Figure 4:
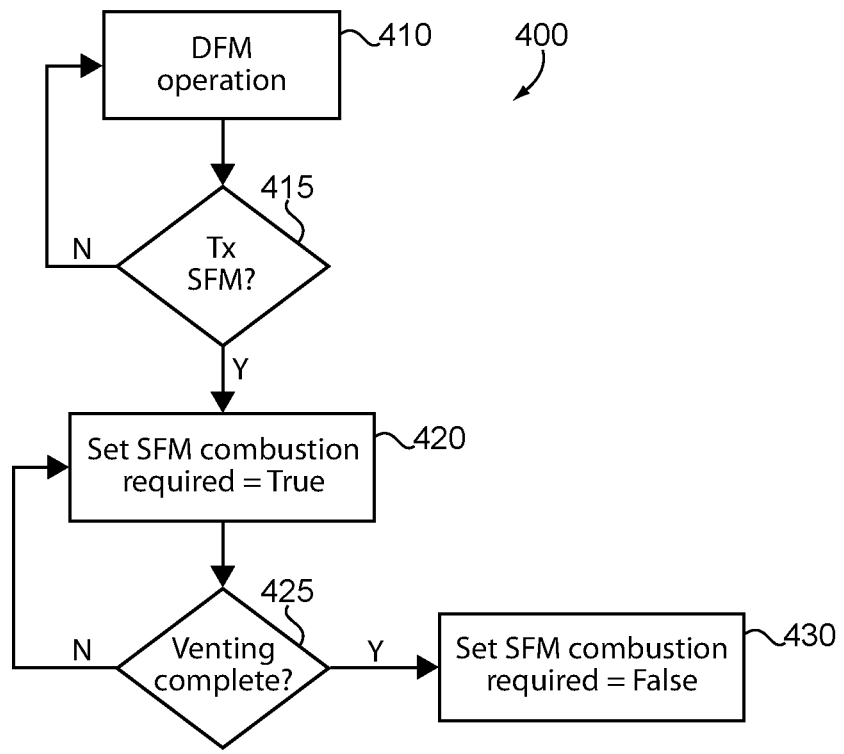
FIG. 4 is a flow diagram illustrating exemplary controls for a dual-fuel internal combustion engine system.

With reference to FIG. 4 there is illustrated a flow diagram of an exemplary control process 400 for a dual-fuel internal combustion engine system. Control process 400 may be implemented in and executed by one or more components of an electronic control system which is structured to control operation of a dual-fuel engine system, for example, in ECM 200 which is structured to control operation of systems 20 and 21 described above as well as in other electronic control system components or combinations of multiple components.

Process 400 includes operator 410 in which a dual-fuel engine system operates in a dual-fuel mode to combust diesel fuel and gaseous fuel. These controls may utilize a closed loop engine speed controller to control diesel fueling and determine a substitution rate for gaseous fuel. From operator 410, process 400 proceeds to conditional 415 which evaluates whether a transition condition is true. The transition condition may indicate a commanded or requested transition out of dual-fuel mode, for example, to a diesel-only fuel mode or to a shutdown mode where no fueling is to be supplied. If conditional 415 evaluates not true, process 400 returns to operation 410. If conditional 415 evaluates true, process 400 proceeds to operation 420.

Operation 420 sets a combustion required condition to true. The single fuel mode combustion required condition is effective to require the engine to continue supplying diesel fuel notwithstanding other requests to end diesel fueling. From operation 420, process 400 proceeds to conditional 425 which evaluates whether a ventilation complete condition is true. The ventilation complete condition may be determined, for example, using the timer and/or counter threshold techniques disclosed herein. If conditional 425 evaluates not true, process 400 returns to operation 420. If conditional 425 evaluates true, process 400 proceeds to operation 430 which sets a combustion required condition to false thereby permitting engine shutdown or other interruption of diesel fueling which may be commanded. From operation 430, process 400 proceeds to operation 440 which may end or repeat process 440, for example, depending on whether the engine has shut down or returned to dual-fuel mode operation.

Figure 5:
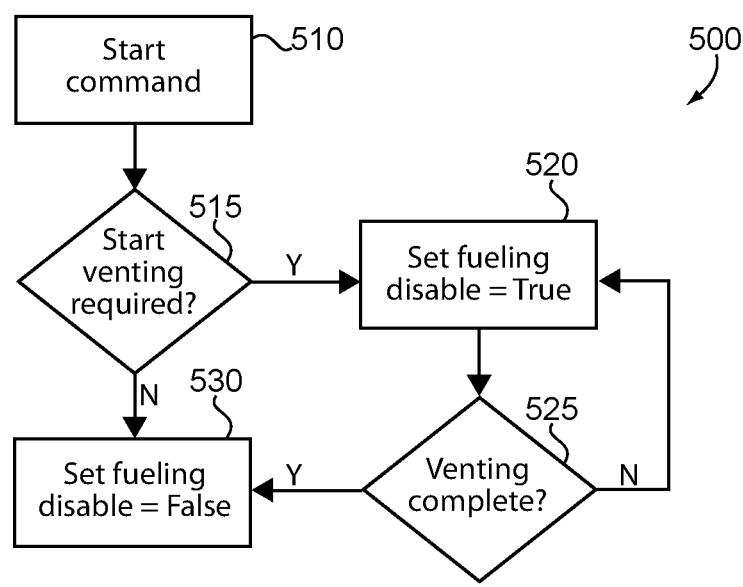
FIG. 5 is a flow diagram illustrating exemplary controls for a dual-fuel internal combustion engine system.

With reference to FIG. 5 there is illustrated a flow diagram of an exemplary controls process 500 for a dual-fuel internal combustion engine system. Control process 500 may be implemented in and executed by one or more components of an electronic control system which is structured to control operation of a dual-fuel engine system, for example, in ECM 200 which is structured to control operation of systems 20 and 21 described above as well as in other electronic control system components or combinations of multiple components.

Process 500 includes operator 510 which provides one or more commands for starting a dual-fuel engine system. The starting commands may include activating a starter motor, diesel fueling commands and other commands. From operator 510, process 500 proceeds to conditional 515 which evaluates whether a starting ventilation required condition is true. The starting ventilation required condition may be set to true under various conditions, for example, after shutdown from dual-fuel mode without venting (e.g., by actuation of an ASOV to rapidly interrupt combustion) and/or upon the first start attempt by a control system component implementing process 500. If conditional 515 evaluates not true, process 500 proceeds to operation 530 which sets a fuel disabling condition to false effective to allow diesel fueling if otherwise commanded. If conditional 515 evaluates true, process 500 proceeds to operation 520 which sets a fuel disabling condition to true effective to inhibit diesel fueling notwithstanding whether it is otherwise commanded.

From operation 520, process 500 proceeds to conditional 525 which evaluates whether a ventilation complete condition is true. The ventilation complete condition may be determined, for example, using the timer and/or counter threshold techniques disclosed herein. If conditional 525 evaluates not true, process 500 returns to operation 520. If conditional 525 evaluates true, process 500 proceeds to operation 530 which sets the fuel disabling condition to false effective to allow whatever diesel fueling may be commanded. From operation 530, process 500 proceeds to operation 540 which may end or repeat process 540, for example, depending on whether the engine has shut down or returned to dual-fuel mode operation.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method of controlling a system including an engine and an electronic controller in operative communication with the engine, the method comprising:
   operating the system in a dual-fuel combustion mode in which both diesel fuel and gaseous fuel are supplied to and combusted by the engine;
   commanding a transition from the dual-fuel mode to a diesel-only mode in which only diesel fuel is supplied to and combusted by the engine; and
   in response to the commanding the transition from the dual-fuel mode to the diesel-only mode:
   operating an actuator to stop supplying gaseous fuel to the engine,
   monitoring a gaseous fuel ventilation condition of the engine after the act of operating the actuator to stop supplying gaseous fuel to the engine,
   commanding operation of the engine using first combustion controls configured for the dual-fuel mode if the act of monitoring indicates that the gaseous fuel ventilation condition is not satisfied, and
   commanding operation of the engine using second combustion controls configured for the single-fuel mode if the act of monitoring indicates that the gaseous fuel ventilation condition is satisfied.

2. The method of claim 1 wherein the monitoring the gaseous fuel ventilation condition of the engine comprises monitoring whether a predetermined ventilation volume has been displaced by the engine.

3. The method of claim 2 wherein the predetermined ventilation volume is determined based upon an intake system volume, an engine displacement volume and an exhaust system volume.

4. The method of claim 1 comprising:
   commanding starting of the engine in the diesel-only mode; and
   in response to the act of commanding starting of the engine, monitoring the gaseous fuel ventilation condition of the engine and inhibiting provision of diesel fuel to the engine if the gaseous fuel ventilation condition is not satisfied.

5. The method of claim 4 wherein the monitoring the gaseous fuel ventilation condition of the engine comprises monitoring one of a timer value and a counter value.

6. The method of claim 5 wherein the act of monitoring comprises one of decrementing and incrementing the one of the timer value and the counter value and evaluating the one of the time value and the counter value relative to a predetermined value indicating that the gaseous fuel ventilation condition is satisfied.

7. The method of claim 1 wherein the act of operating the system in a dual-fuel combustion mode comprises supplying gaseous fuel to the engine at an intake system location upstream of an intake manifold.

8. The method of claim 1 wherein the gaseous fuel ventilation condition indicates whether or not removal of unburned gaseous fuel present in the intake system has occurred.

9. The method of claim 1 comprising: inhibiting operation of a non-emergency engine shutdown command if the act of monitoring indicates that the gaseous fuel ventilation condition is not satisfied.

10. A method of controlling a system including a dual-fuel engine with an electronic controller in operative communication with the engine, the method comprising:
    after starting the engine, operating the system in a dual-fuel combustion mode in which both diesel fuel and gaseous fuel are supplied to and combusted by the engine;
    commanding a transition from the dual-fuel mode to a diesel-only mode in which only diesel fuel is supplied to and combusted by the engine; and
    in response to the commanding the transition from the dual-fuel mode to the diesel-only mode:
    operating a valve to stop supplying gaseous fuel to the engine,
    monitoring a gaseous fuel ventilation condition,
    commanding operation of the engine using first combustion controls configured for the dual-fuel mode if the gaseous fuel ventilation condition is not satisfied.

11. The method of claim 10 wherein the gaseous fuel ventilation condition will ensure that a volume has been displaced by the engine to ventilate gaseous fuel from an intake system and an exhaust system.

12. The method of claim 11 wherein the volume is determined based upon a plurality of calibratible values indicating volume information for a plurality of components of an intake system volume, a plurality of components of an exhaust system volume and the engine displacement.

13. The method of claim 10 comprising:
commanding operation of a starter motor to start the dual-fuel engine;
evaluating whether starting ventilation is required to remove unburned gaseous fuel from the system prior to providing diesel fuel to the engine;
if starting ventilation is required, inhibiting provision of diesel fuel to the engine until the gaseous fuel ventilation condition is satisfied; and
once the gaseous fuel ventilation condition is satisfied, allowing provision of diesel fuel to the engine.

14. The method of claim 10 further comprising inhibiting operation of an non-emergency engine shutdown command if the gaseous fuel ventilation condition is not satisfied.

15. The method of claim 10 further comprising commanding operation of the engine using second combustion controls configured for the single-fuel mode if the gaseous fuel ventilation condition is satisfied.

16. The method of claim 10 wherein the gaseous fuel ventilation condition will ensure that a volume has been displaced by the engine to ventilate gaseous fuel from an intake system and an exhaust system.

17. A system comprising:
an engine including an intake system and configured to be selectably operated in a dual-fuel combustion mode in which both diesel fuel and gaseous fuel are supplied to and combusted by the engine and a diesel-only mode in which only diesel fuel is supplied to and combusted by the engine; and
an electronic controller in operative communication with the engine, the electronic controller configured to perform the acts of:
operating the system in the dual-fuel combustion mode;
commanding a transition from the dual-fuel mode to the diesel-only; and
in response to the commanding the transition, operating an actuator to stop supplying gaseous fuel to the engine and, thereafter, evaluating a gaseous fuel ventilation condition of the engine, commanding operation of the engine using first combustion controls configured for the dual-fuel mode if the act of evaluating indicates that unburned gaseous fuel remains in the intake system of the engine, and commanding operation of the engine using second combustion controls configured for the single-fuel mode if the act of evaluating indicates that unburned gaseous fuel does not remain in the intake system of the engine.

18. The method of claim 17 wherein the engine is configured to supply gaseous fuel to the engine at location of the intake system upstream from an intake manifold.

19. The method of claim 18 wherein the engine is configured to supply gaseous fuel to the engine at a location of the intake system upstream from a compressor.

20. The method of claim 17 wherein the electronic controller is configured to perform the act of inhibiting a non-emergency engine shutdown if the act of evaluating indicates that unburned gaseous fuel remains in the intake system of the engine.

* * * * *